No. 853,689. PATENTED MAY 14, 1907.
D. F. GREEN.
GUARD FOR EYEGLASSES.
APPLICATION FILED OCT. 25, 1906.

WITNESSES:
S. Milton McFerran
Augusta Viberg.

Dallas F. Green INVENTOR

BY Chapin & Denny
His ATTORNEYS

UNITED STATES PATENT OFFICE.

DALLAS F. GREEN, OF FORT WAYNE, INDIANA.

GUARD FOR EYEGLASSES.

No. 853,689.    Specification of Letters Patent.    Patented May 14, 1907.

Application filed October 25, 1906. Serial No. 340,455.

*To all whom it may concern:*

Be it known that I, DALLAS F. GREEN, a citizen of the United States, residing at Fort Wayne, in the county of Allen, in the State of Indiana, have invented certain new and useful Improvements in Guards for Eyeglasses; and I do hereby declare that the following is a full, clear, and exact description of the invention, whichwill enable others skilled in the art to which it appertains to make and use the same, reference being had to the accompanying drawings, which form part of this specification.

My invention relates to improvements in guards for eyeglasses.

It is well known that to secure eyeglasses in position in use a pair of coöperating lateral guards of some kind is required in addition to the regular bridge-spring; that on account of the wedge shape of the nose either a sudden jar or a stooping forward of the wearer starts a preliminary upward and loosening movement followed by a forward tilting or displacement of the eyeglasses, in the eyeglass guards now in use; followed by a dropping of the same; and that the lateral pressure of these guards almost invariably causes considerable irritation of the skin and consequent discomfort.

The object, therefore, of my present invention is to provide an improved eyeglass guard, of neat, simple and economical construction, adapted to avoid the usual irritation and discomfort by distributing the adhesive pressure over a larger area, and to more reliably secure the eyeglasses in position by bracing them against any upward movement in use.

My invention consists of an eyeglass guard to be used in duplicate in coöperation with any suitable bridge-spring each guard consisting of a single piece of flexible sheet metal sufficiently ductile to be readily bent in adjusting it to the desired shape, and yet sufficiently elastic to retain its shape under ordinary usage, having an unusual extension of its length to distribute the irritating pressure, and to form a gentle bearing against the arch of the orbital cavity to prevent accidental upward and forward displacement of the eyeglasses in stooping over and the like. The guard also has a series of spaced perforations so arranged as to increase its adhesion in use, and to equalize its elasticity.

Figure 1:
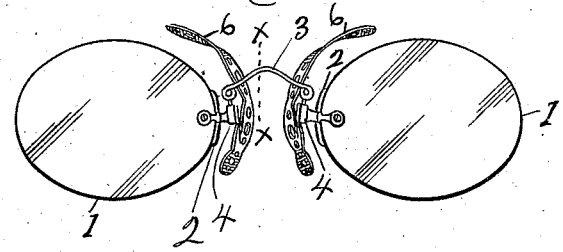
Figure 2:
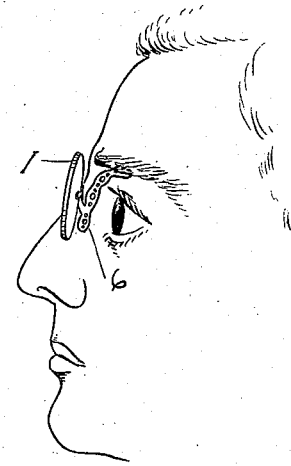
Figure 3:
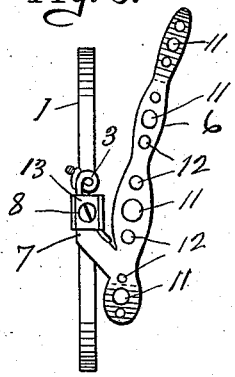
Figure 4:
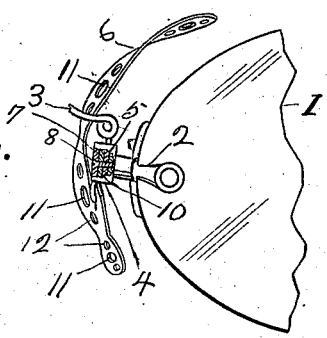
Figure 5:
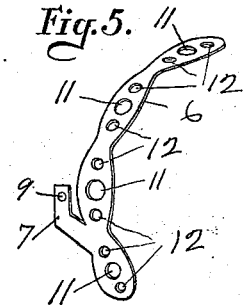

Similar reference numerals indicate like parts throughout the several views of the drawings in which Figure 1 is a front elevation of a pair of rimless eyeglasses of common form and proper mountings with my invention in position thereon. Fig. 2 is an end perspective of the same in position upon the nose, showing the bearing of the upper end of the guard upon the orbital arch. Fig. 3 is an enlarged cross-section of Fig. 1 taken on the line $x$—$x$ looking to the left showing the general contour of the guard, and the relative arrangement of the lateral apertures therein. Fig. 4 is a fragmentary enlarged view of the same showing the manner of securing my invention in position thereon. Fig. 5 is a detail perspective of my improved guard showing the lateral shank by which it is rigidly secured to the mounting.

The eyeglasses upon which my invention is used may be of any proper construction rimless or otherwise, with any desired lenses 1 having any proper mountings 2, and any desired form of bridge-spring 3.

The mountings shown have a pair of opposite studs or clamping posts 4 fixed as usual upon the inner and adjacent ends of the lenses 1 in the usual manner. These studs have their adjacent faces vertically recessed, as shown at 5 in Fig. 4 to receive and secure the opposite ends of the bridge-spring, and the shank of the guard about to be described.

The guard 6 is stamped in a single piece from proper sheet metal, preferably gold or silver, is approximately semicircular in contour is laterally apertured throughout its length, and is provided upon its inner edge with a lateral shank 7 in vertical arrangement, and adapted to be mounted in the recess 5 of the stud 4 and rigidly clamped therein by means of the screw 8 which passes through the opening 9 of the shank and also through the flattened and apertured corresponding end 10 of the bridge-spring, Fig. 4.

The body of the guard 6 of spring-metal while sufficiently pliable to permit the operator to readily adjust it to any desired curvatures, is yet sufficiently elastic to preserve its shape and impart a proper holding pressure in practical use. While this guard may be of any desired contour in cross-section or laterally, and may be solid and plain instead of apertured, the body thereof preferably has its opposite edges correspondingly scalloped, Fig. 5, and the portions included between each pair of scallops are identically apertured, each being provided with three apertures, the central one 11 of which is of sufficiently greater diameter than the ones 12 on each side thereof to correspond with the greater width and strength of the central part of each scalloped portion.

By this construction and arrangement of these apertures the strength and elasticity of the guard are substantially equalized. These apertures perform the additional function of materially increasing the adhesive power of the guard by the slight protrusion of the skin into the same in use.

In use the faces of the opposite ends of the guard are in different hemispherical planes from those of the central portion and from each other, as shown in Fig. 4 to fit the corresponding surfaces of the face on which they bear.

The operation and manner of employing my invention is briefly stated substantially as follows: The opposite flattened and apertured ends of the bridge-spring 3 being first placed in the recess 5 of the companion studs 4, the guards 6 are arranged adjacent to the inner face of the bridge-spring 3 with the shanks 7 thereof snugly fitted in the recess 5 adjacent to the outer face of the corresponding flattened end of the bridge-spring, after which they are rigidly clamped and secured in position by means of the screws 8 and the washers 13.

The relative arrangement of the shank 7 is such that when the companion guards 6 are thus secured in position they will stand in a slightly oblique position relative to the inner face of the lenses, as shown, whereby the upper ends of the guards which are turned in opposite directions and have substantially the curvature of the adjacent portion of the lenses, are adapted, when properly adjusted to fit below and gently bear against the orbital arch, as shown in Fig. 2. The lower ends of the guards will be slightly outwardly flaring to correspond to the sides of the nose on which they bear, but the lower half of the guards will be in substantially a vertical position. By this construction and adjustment of the guards 6 they not only brace and support the eyeglasses downwardly and laterally, but also against any upward movement by which they are so frequently dismounted from the nose, as when the wearer momentarily assumes a stooping posture.

Having thus described my invention and the manner of employing the same, what I desire to secure by Letters Patent is:

1. In a guard for eyeglasses a pair of curved spring plates in vertical arrangement relative to their mountings, and having integral shanks in such relation thereto that the lower ends thereof will functionate as nose guards, and the upper ends thereof will bear against the respective orbital arches; mountings for carrying the guards; and means for rigidly securing the guards in position.

2. A guard for eyeglasses consisting of a pair of coöperating spring-metal plates having scalloped edges and a series of spaced perforations, the lower ends of the said plates being adapted to functionate as nose guards and their upper ends to bear upwardly against the orbital arch to brace the eyeglasses against an accidental displacing upward movement thereof.

Signed by me at Fort Wayne, Allen county, State of Indiana, this 23rd day of October, A. D. 1906.

DALLAS F. GREEN.

Witnesses:
 WATTS P. DENNY,
 AUGUSTA VIBERG.